United States Patent
Ge et al.

(10) Patent No.: US 10,230,681 B2
(45) Date of Patent: Mar. 12, 2019

(54) METHOD AND APPARATUS FOR UNIFIED MESSAGE ADAPTATION

(71) Applicant: International Business Machines Corporation, Armonk, NY (US)

(72) Inventors: Yi Ge, Beijing (CN); Jian Wang, Beijing (CN); Qi Yu, Beijing (CN); Guo T. Zhao, Beijing (CN); Yu C. Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 14/968,137

(22) Filed: Dec. 14, 2015

(65) Prior Publication Data

US 2017/0171143 A1    Jun. 15, 2017

(51) Int. Cl.
*G06F 15/16* (2006.01)
*H04L 12/58* (2006.01)
(Continued)

(52) U.S. Cl.
CPC .............. *H04L 51/36* (2013.01); *H04L 67/12* (2013.01); *H04L 69/22* (2013.01)

(58) Field of Classification Search
None
See application file for complete search history.

(56) References Cited

U.S. PATENT DOCUMENTS 6,748,421 B1 * 6/2004 Ozkan .................. G06F 3/0481
                                                    348/E7.085
2013/0263280 A1 * 10/2013 Cote ..................... G06F 21/62
                                                    726/26
(Continued)

FOREIGN PATENT DOCUMENTS

CN    103095823 A    5/2013
CN    103686848 A    3/2014
(Continued)

OTHER PUBLICATIONS

Wang et al, "Pub/Sub on Stream: A Multi-core Based Message Broker with QoS Support", Dept. of Electronic Engineering, Tsinghua University and IBM Research China, Jul. 2012, pp. 1-35.
Bandyopadhyay, et al. "Role of Middleware for Internet of Things: A Study", International Journal of Computer Sciende & Engineering Survey, vol. 2, No. 3, Aug. 2011, pp. 94-105.
https://developers.google.com/protocol-buffers/docs/tutorials, C++ Tutorial, Java Tutorial, Python Tutorial, Sep. 2014, pp. 1-40.
(Continued)

*Primary Examiner* — Phyllis A Book
(74) *Attorney, Agent, or Firm* — Scully, Scott, Murphy & Presser, PC; Vazken Alexanian (57) ABSTRACT

A method of message adaptation in the Internet of Things (IoT) includes receiving a message containing data collected by the plurality of sensors, identifying a message type, looking up a message descriptor according to the message type, looking up a message template matching the message type and outputting the message with the matched message template for content-based processing. In one embodiment, the method includes identifying the message is a text message, parsing the message according to message type and message descriptor, and creating a sequence of key-value pairs for the text message. In one embodiment the method includes determining that there is no matched or valid matched message template and parsing the message according to the message descriptor to generate and store a message template including the message type, a message item list and a message item position list and attaching the message template to the message.

18 Claims, 10 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2013/0290305 A1 | 10/2013 | Feng et al. | |
| 2014/0032690 A1* | 1/2014 | Ramarao | G06F 9/546 |
| | | | 709/206 |
| 2014/0201838 A1* | 7/2014 | Varsanyi | G06F 21/552 |
| | | | 726/23 |
| 2014/0222813 A1 | 8/2014 | Yang et al. | |
| 2014/0241373 A1 | 8/2014 | Pasam et al. | |
| 2014/0331073 A1 | 11/2014 | Feng et al. | |
| 2015/0119655 A1 | 4/2015 | Mayou et al. | |
| 2015/0271109 A1* | 9/2015 | Bullotta | H04L 67/02 |
| | | | 370/466 |
| 2015/0271229 A1 | 9/2015 | Bullotta et al. | |
| 2015/0381737 A1* | 12/2015 | Quinn | H04L 67/12 |
| | | | 709/217 |
| 2016/0050128 A1 | 2/2016 | Schaible et al. | |
| 2017/0155743 A1* | 6/2017 | Sukhija | H04L 67/2823 |

FOREIGN PATENT DOCUMENTS

| | | |
|---|---|---|
| WO | 2012/152133 A1 | 11/2012 |
| WO | 2014/130568 A1 | 8/2014 |

OTHER PUBLICATIONS http://www.ogf.org/dfdl/, Open Grid Forum, Data Format Description Language, Sep. 2014, pp. 1-5.
List of IBM Patents or Patent Applications Treated as Related dated Oct. 1, 2018, pp. 2.

\* cited by examiner

METHOD AND APPARATUS FOR UNIFIED MESSAGE ADAPTATION

BACKGROUND OF THE INVENTION

This disclosure relates generally to the Internet of Things (IoT), and particularly to unified message adaptation in the IoT.

The IoT is a network of physical objects or "things" embedded with electronics, software, sensors, and connectivity to enable objects to exchange data with the production, operator and/or other connected devices. IoT allows objects to be sensed and controlled remotely across existing network infrastructure, creating opportunities for more direct integration between the physical world and computer-based systems, and resulting in improved efficiency, accuracy and economic benefit.

Figure 1:
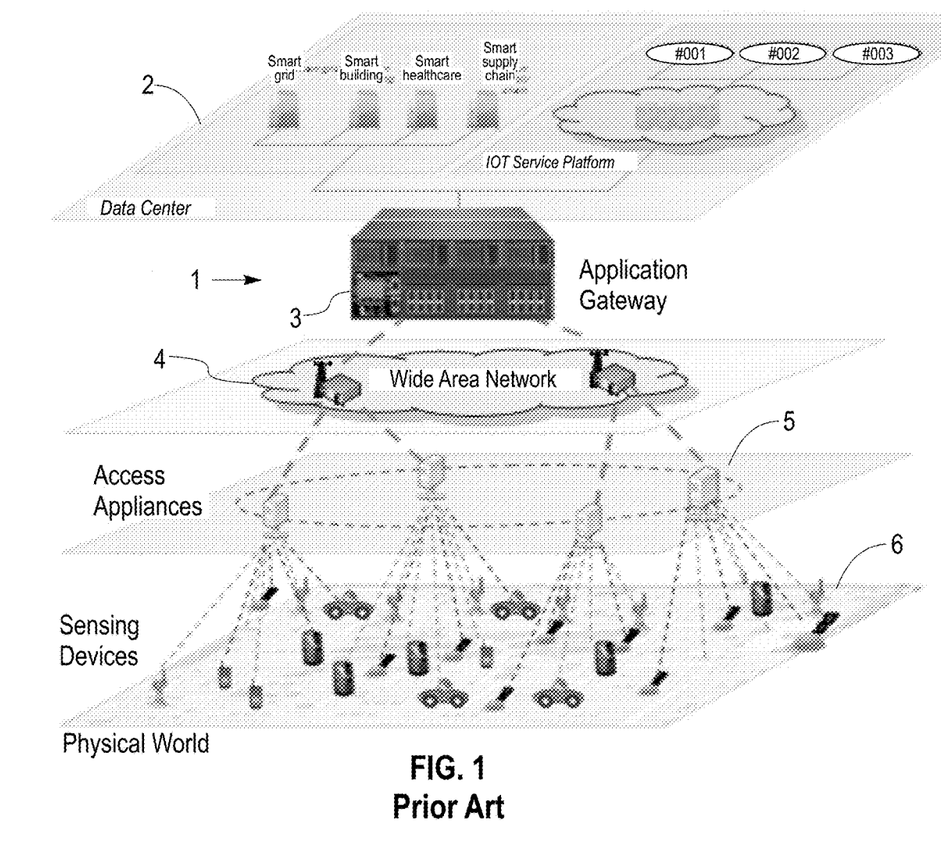
FIG. 1 is a schematic view of architecture of an IoT system.

FIG. 1 is a schematic diagram of an IoT system 1. The basic components are a data center 2 having a plurality of applications, an application gateway 3, a wide area network 4, a network of access appliances 5 and a collection of sensing devices 6. The IoT system can include applications focused on various physical world functions and systems such as, pipe management, smart electrical grid, travel & transportation, shipping logistics, home healthcare and smart city applications.

With the growth of IoT applications, the number of devices and data volume supported in IoT applications is growing dramatically. In addition, many of IoT applications are time sensitive. They require consistent low latency which can be as low as sub second or even mini-second. Besides accessing the raw data, it raises a critical challenge on the performance of messaging middleware for its in-line content based processing, which provides a flexible message content processing platform and a fast path for application event identification. Another challenge to the content based processing of messaging middleware is the capability to dynamically support various kinds of data formats, as generated by a large volume of heterogeneous IoT devices, such as Google Protocol Buffer: https://developers.google.com/protocol-buffers/docs/tutorials and Data Format Description Language (DFDL): http://www.ogf.org/dfdl/.

The characteristics of IoT Systems include large-scale devices and networks, heterogeneous sensory devices, huge volume of sensor data, massive sensors, high frequency, complex system architecture and limited resources (e.g. power) at the sensor end. The messaging-related components, such as the sensor access appliance and application gateway, need to rapidly receive sensor data and process them. The components also need to have the adaptability for heterogeneous sensory devices. Many devices produce binary messages but many produce text messages having many different formats.

One prior art solution is Data Format Description Language (DFDL) which describe text and binary data formats and leverages W3C XML Schema Definition Language (XSDL) 1.0.

DFDL is not a format for data; it is a way of describing any data format. One known DFDL Implementation is IBM WebSphere Message Broker and Daffodil, which is open source and in development. Another prior art solution is Google Protocol Buffers (GPB) which is a language-neutral, platform-neutral, extensible mechanism for serializing structured data. The GPB defines the data structure by protocol buffer language, generates source code to write and read the structured data to and from a variety of data streams and supports a variety of languages—Java, C++, or Python.

The problems with the above prior art solutions is a high parsing overhead and that they are not adaptive to parsing multiple message formats at runtime and therefore, a message specific programming interface is necessary.

SUMMARY OF THE INVENTION

In one embodiment, a method of message adaptation in the Internet of Things (IoT) is disclosed. The IoT comprises a data center having a plurality of applications, an application gateway, a wide area network, a network of access appliances and a plurality of sensing devices. The method includes receiving a message containing data collected by the plurality of sensors, the message having a message descriptor including message type, payload type, message configuration and whether the message is binary, identifying a message type of the received message; looking up a message descriptor according to the message type; looking up a message template matching the message type; and outputting the message with the matched message template to a corresponding application in the data center for content-based processing. In one embodiment, the method includes identifying the message is a text message, parsing the message according to message type and message descriptor, and creating a sequence of key-value pairs for the text message. In one embodiment the method includes determining that there is no matched or valid matched message template and parsing the message according to the message descriptor to generate and store a message template including the message type, a message item list and a message item position list and attaching the message template to the message. In one embodiment the parsing includes parsing the sequence of the items in the message and listing the items in the position list according to their sequence.

The method according to one embodiment includes integrating context information into the output matched message template which includes getting a message ID, device ID and client ID from the message, looking up and verifying context descriptors according to the message ID, device ID and client ID in an ID-context mapping table, finding the context entry corresponding to each of the context descriptors and a related tag, and integrating the context descriptors of the context entries into the matched message template.

The method according to one embodiment includes integrating context information into the matched message template using variant message parsing which includes finding an ID context entry and Var Len context entry according to main ID/DevID, finding and filling V1 len with TV1_Len value according to tag/context impact indication, updating V1_base, V2 off and other affected fields in var_len e context entry, finding V1 Len form var_len context entry according to tag/context dependence indication, and runtime calculating AV1 temp offset according to V1 base and its relative offset.

In one embodiment, a non-transitory article of manufacture tangibly embodying computer readable instructions, which when implemented, cause a computer to perform the steps of a method for message adaptation in the Internet of Things (IoT) is disclosed. The method includes receiving a message containing data collected by the plurality of sensors, the message having a message descriptor including message type, payload type, message configuration and whether the message is binary, identifying a message type of the received message, looking up a message descriptor according to the message type, looking up a message template matching the message type and outputting the message with the matched message template to a corresponding application in the data center for content-based processing.

In one embodiment, a computer system for message adaptation in the Internet of Things (IoT) is disclosed. The computer system includes one or more computer processors, one or more non-transitory computer-readable storage mediums, program instructions, stored on the one or more non-transitory computer-readable storage mediums, which when implemented by the one or more processors, cause the computer system to perform the steps of receiving a message containing data collected by the plurality of sensors, the new message having a message descriptor including message type, payload type, message configuration and whether the message is binary, identifying a message type of the received message, looking up a message descriptor according to the message type, looking up a message template matching the message type and outputting the message with the matched message template to a corresponding application in the data center for content-based processing.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

Figure 2:
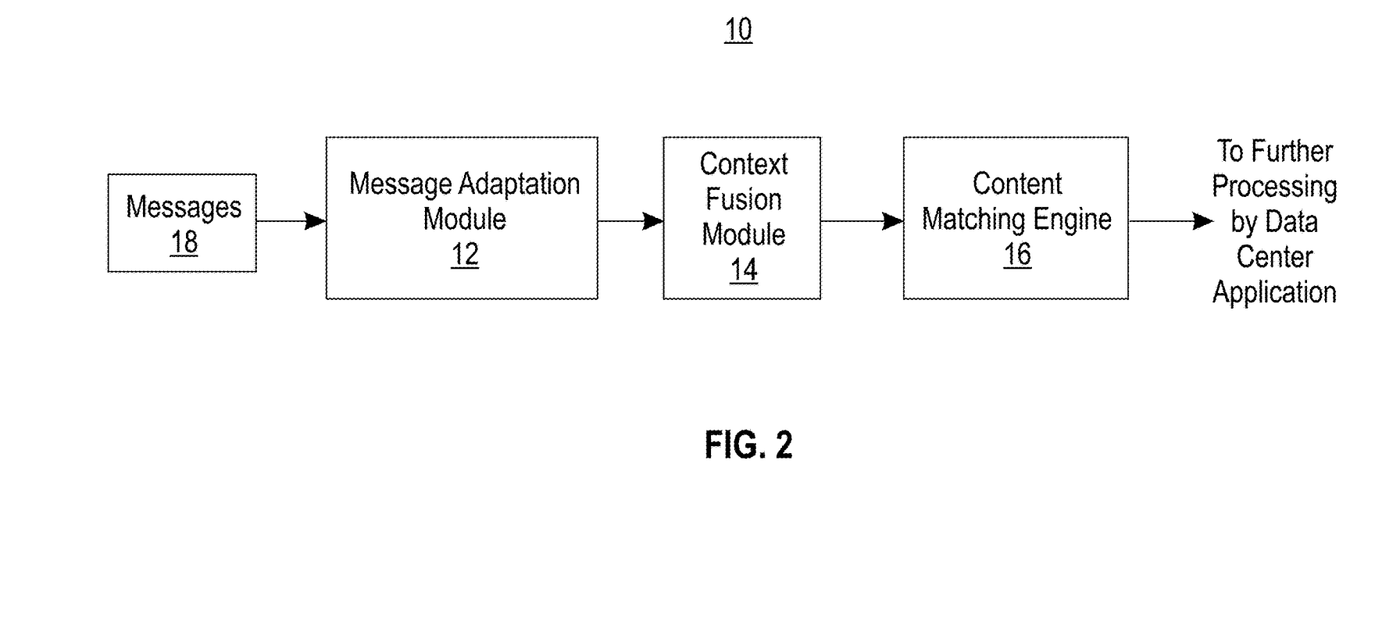
FIG. 2 is a block diagram of a system for unified message adaptation according to an embodiment of the invention.

The present disclosure is directed to a template-based messaging system in the Internet of Things (IoT). The IoT comprises a data center having a plurality of applications, an application gateway, a wide area network, a network of access appliances and a plurality of sensing devices. As shown in FIG. 2, one embodiment includes messaging system 10 having message adaptation module 12, context fusion module 14 and content matching engine 16. Messages 18 containing data collected by the plurality of sensors are input to the message adaptation module 12. Context information relating to the sensors and the data collected by the sensors is input to context fusion module 14. The message adaptation module 12 parses a new incoming message 18 to generate store a message template. The message template includes an item list identifying the properties of each item in the message and a list of the position of each item in the message. Subsequent incoming messages from a similar or same device are parsed using the position information of each item from the previously parsed message. The message template is attached to the message and is then input to the context fusion module 14. Context fusion module 14 identifies the context information for the message and integrates the context information into the template.

The message with the attached context enriched message template is sent to the content matching engine 16 for subscription rule matching. According to the values of the message items and subscription rules, content matching engine 16 either drops the unmatched message or selects the corresponding processing route for the matched messages. Thereafter, content-based processors handle the data items of the message according to the user requirements. Finally the processed message will be sent out to subscribers by message queues.

Generally, not all the items in a message are used in content based processing. By separately listing the position of each item in the template, the content matching engine can skip those unused items and only fetch required items from the item list in the template for content processing.

Figure 3:
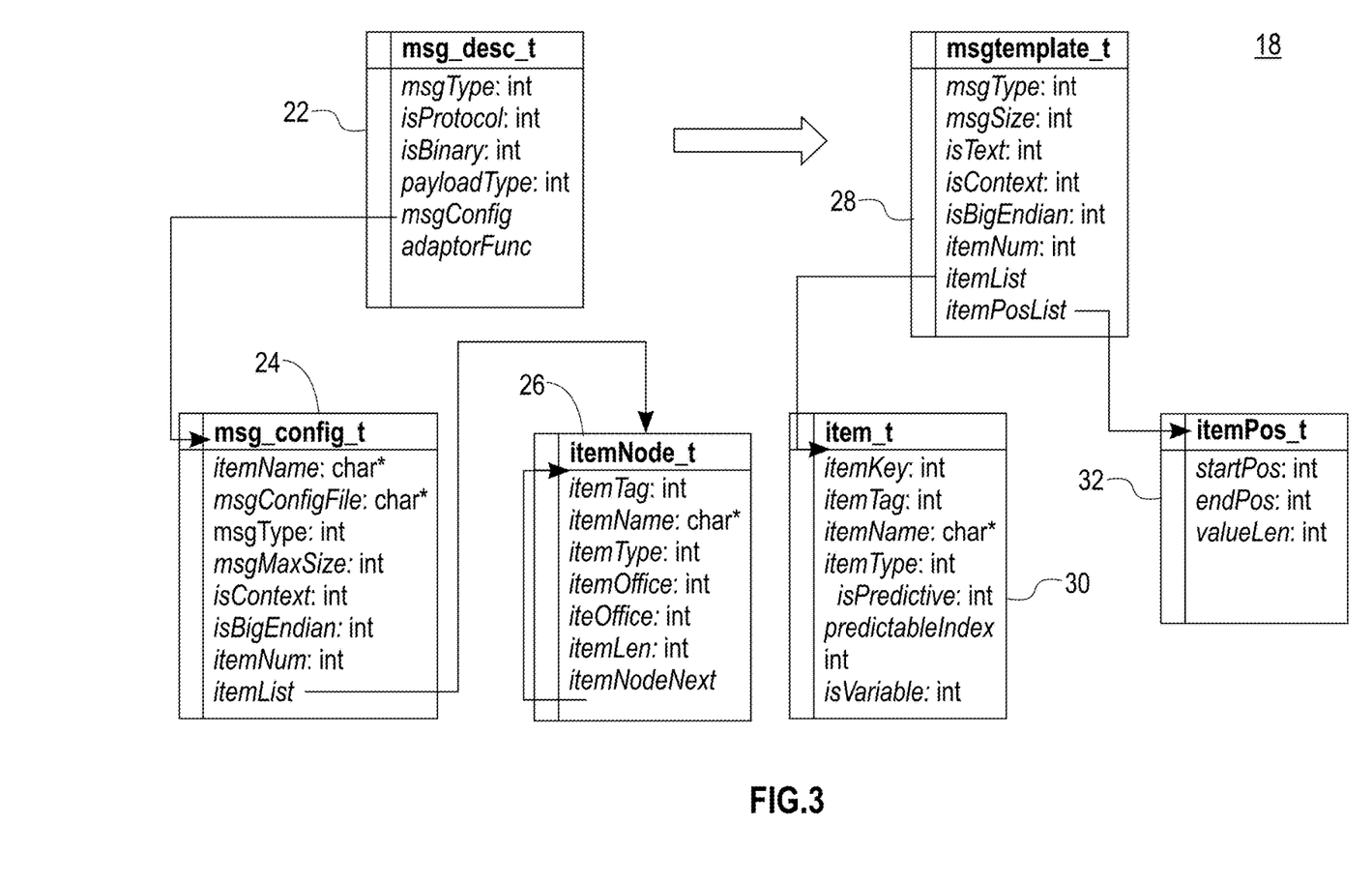
FIG. 3 is a schematic view of a mapping from message description to message template.

FIG. 3 depicts the mapping relationship between a message descriptor 22 of an incoming message and a template 28 generated by parsing the message according to one embodiment of the invention. Message descriptor 22 is the data structure to identify, the message type, protocol, whether it is binary or a text and payload type. The descriptor 22 also includes a message configuration 24 and an item list 26. Message configuration 24 identifies the message name, the file type, the message type, maximum size, whether the message includes context information, whether the big-endian system is used for byte storage, an item number for each item and an item list. The item list 26 includes the properties of each item or node in the message, including the tag, name, type, offset, length and whether there is a next item.

Message template 28 contains not only the details of message format, but also the sequence of the items in the message. Position information 32 lists the items according to their sequence in the message. The position information of each item is determined from the previously parsed message. The template 28 also includes an item list 30 that identifies the item, key, tag, name, type, length, predicate, predicate index and whether the message has a variable length item and this information is used to generate the position list 32 using further processing described below. Once a template is generated it is saved for possible future use. A template can be used for messages continuously sent by the same device or a same type of device.

Figure 4:
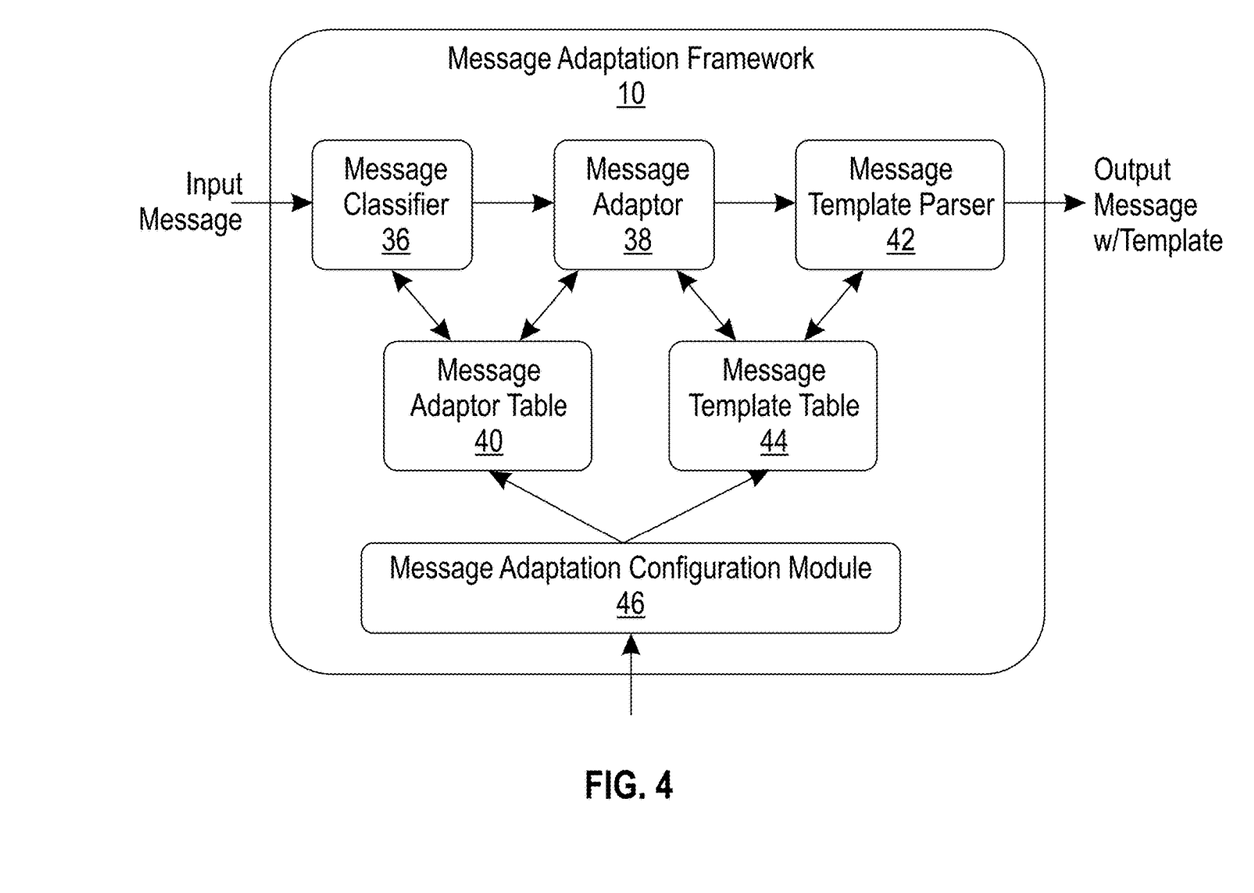
FIG. 4 is a block diagram of a message adaptation framework according to an embodiment of the invention.

As shown in FIG. 4, the present invention provides the message adaptation module 10 embodied in an application gateway of an IoT system. A message classifier module 36 identifies the message type of an incoming message, and whether the type is a binary message or a text message. The message classifier passes that identification to message adaptor 38. With the message classification, a corresponding message adaptation handler is located in message adaptor table 40 and sent to message adaptor 38. For a text message, the message adaptation handler specifies the process by which the message is converted to a format such that it can be treated as a binary message for purposes of parsing the message. Message adaptor 38 looks up the message descriptor 22 according to the message type and takes different actions to generate a template according to payload type. In one embodiment, text adaptation handler parses the message according to the message descriptor and then creates a sequence of key-value pairs with the content of the message. The sequence of key-value pairs is treated as a binary message for generating the position list 32 for each item in the template. For a binary message, message adaptor 38 looks for a message template in message template table 44 that is matched to the message. The matching template is passed to message parser 42 which attaches the template to the message for output. If there is no matching template or the matching template is determined to be invalid, message parser 42 parses the message using the message handler according to the message descriptor and creates a new template for the message. A message template can be found to be invalid if a random check of item locations reveals that the sequence of the items has changed. Message adaptation configuration 46 pre-configures the message adaptation handler and generates message descriptors according to the message schema user input.

Figure 5:
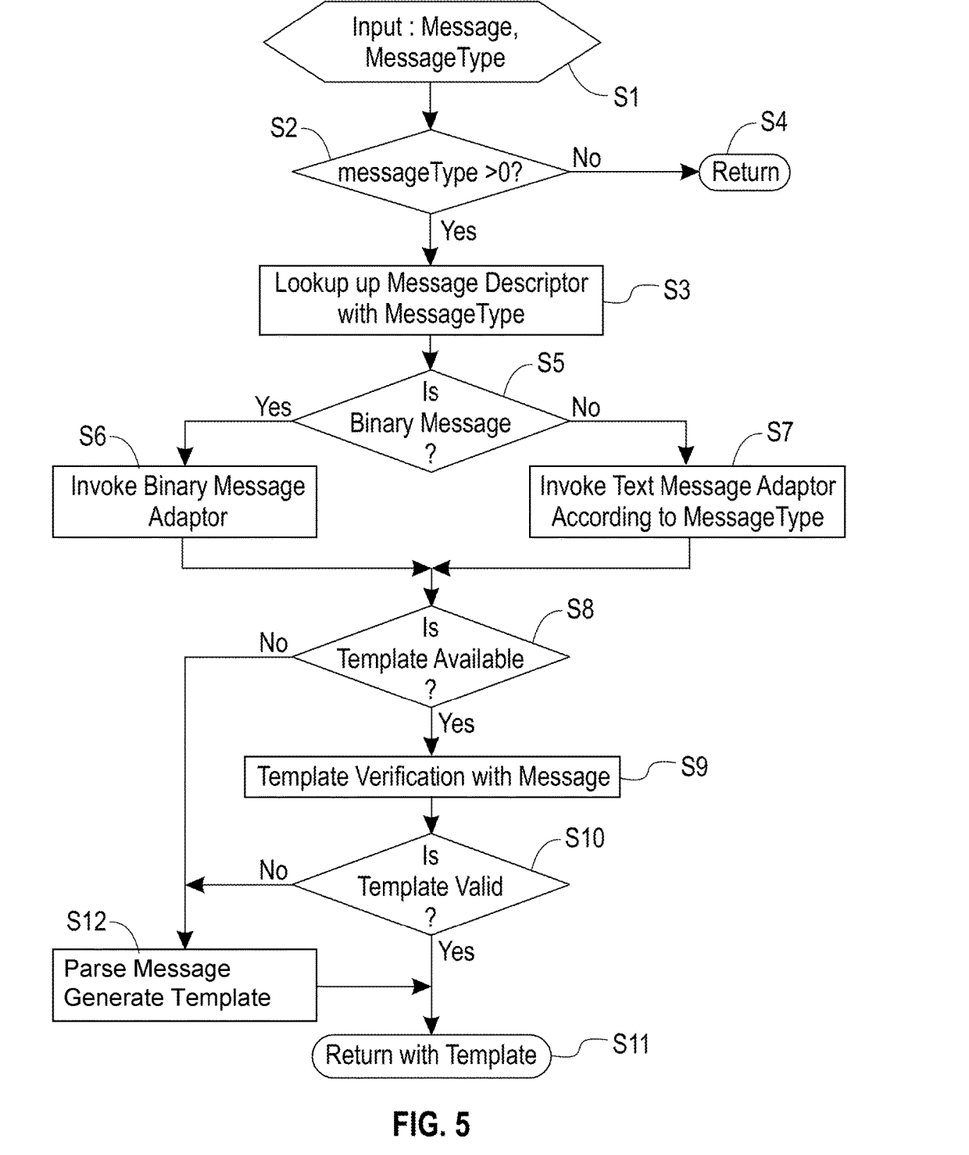
FIG. 5 is a flow chart of the template-based message adaptation according to an embodiment of the invention.

FIG. 5 is a flow chart for the method of template-based message adaptation in accordance with one embodiment. In step S1, a message is input which provides the message and information on the message type. In step S2 it is determined whether the message type information is received. If no, in step S4 the flow returns with error (invalid message type). If the response to step S2 is yes, the flow moves to step S3 in which the message classifier 36 lookups up a message descriptor with the message type. The message classifier module 36 in step S5 determines whether the message is a binary message. If yes, the flow moves to step S6 in which the message adaptor 38 invokes a binary message adaptor process. If the response to step S5 is no, message adaptor 38 invokes a text message adaptor process according to message type. The message adaptor module 38 uses the message template table to determine an appropriate template. In step S8, the message adaptor module 38 determines whether the appropriate template is available. If yes, the message template parser performs template verification. If the template is valid, the message template parser 42 outputs the message with the message template in step S11. If the template is not available in step S8 or if the template is not valid in step S10, then the message parser 42 parses the message and generates a new template in step S12.

Figure 6:
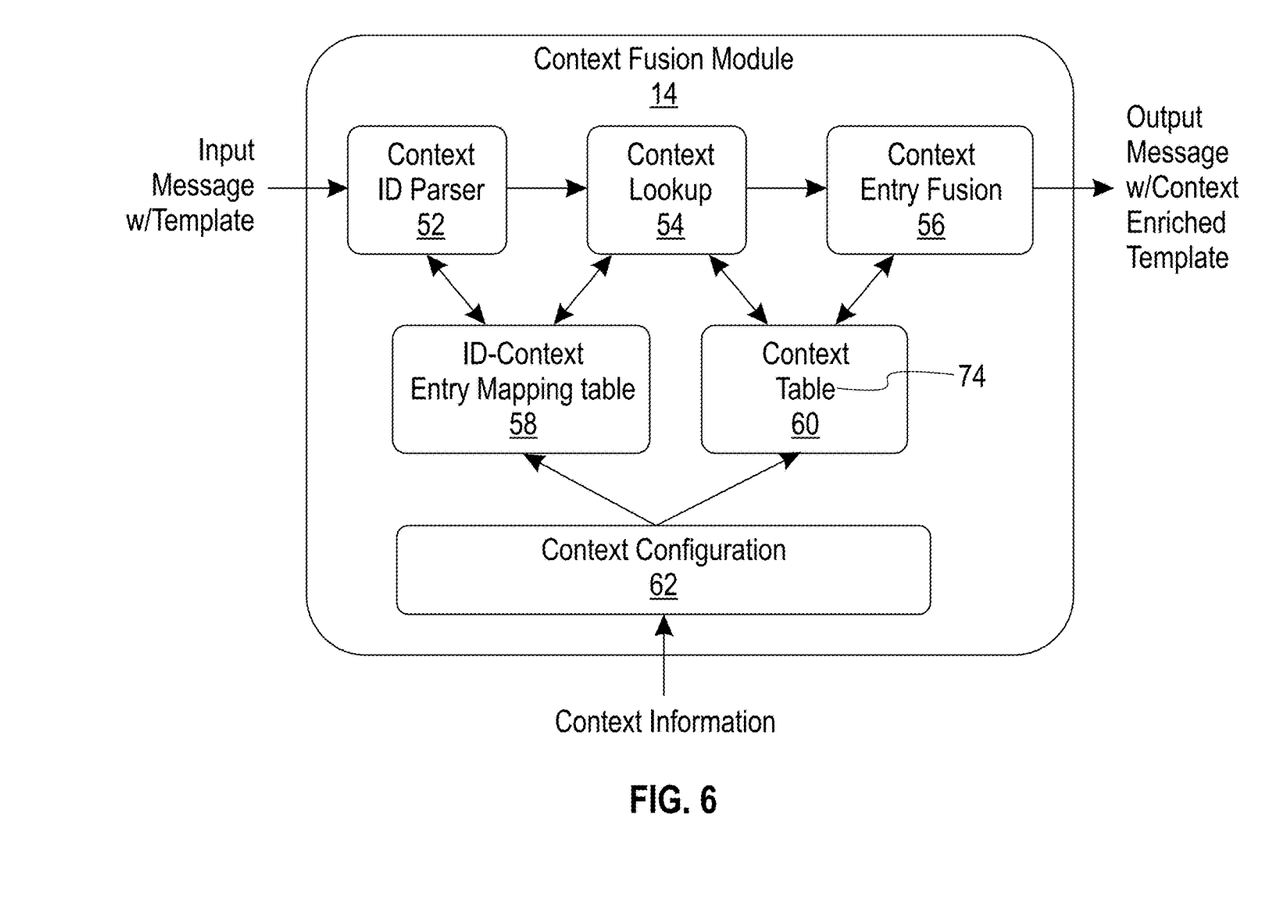
FIG. 6 is a block diagram of a context fusion module according to an embodiment of the invention.
Figure 7:
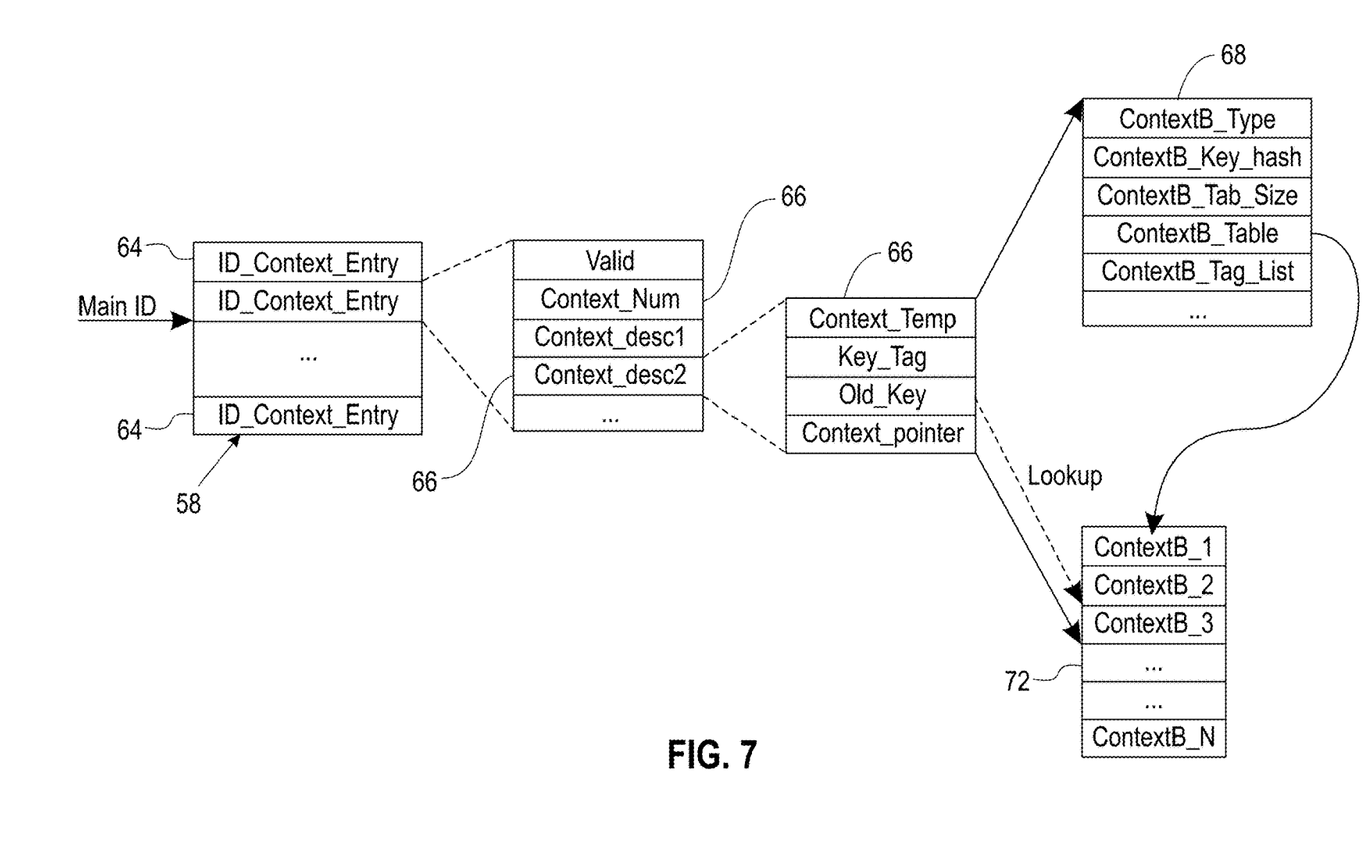
FIG. 7 is a schematic view of the data flow in a context fusion module according to an embodiment of the invention.

FIG. 6 is a block diagram of a context fusion module 14 according to one embodiment of the invention. FIG. 7 is a schematic view of the data flow in the context fusion module 50. The context fusion module 14 includes context ID parser module 52, context lookup module 54, context entry fusion module 56, ID-context entry mapping table 58, context table module 60, and context configuration module 62. A message with a template obtained from the message adaptation module 12 is the input to the context ID parser 52, context information is the input to the context configuration module 62 and the message with context added to the template is the output of the context entry fusion module 56. For example, context information could be profile information, enterprise information and device information. The profile information may include location information of the sensors generating the data items in the message. Device information may include information identifying the sensor such as type and ID. Enterprise information may include information identifying the owner of the sensor.

The context ID parser 52 obtains a main ID from the message, which could be message ID, device ID, device owner ID, device location ID or a combination thereof. Context lookup 54 uses the ID to look up the corresponding context entries 64 in ID-context entry mapping table 58. The context entries 64 contain all the information to identify context information for the device. For example, a device may have a location context, an owner profile context and device type context. In the example of FIG. 7, there are two valid context entries 64, each of which has a corresponding context descriptor 66. The context descriptors 66 include, a context template, a key tag, an old key and a context pointer. The context descriptors contain the information to access the context. The context pointer is a reference to a location context entry in location context table 72 that identifies the location information of the message. The context template 68 contains the descriptors used to interpret the information of the location context entry. In one embodiment, the descriptors 68 include the context type, key hash, tab size, table and tag list. The context lookup module 54 also checks for the latest context information input into context configuration module 62 to lookup and update the reference to corresponding context table entry 60. Finally the context template fusion module combines the valid context descriptors and the message template together to form one combined template and, attaches the combined template to the message. Thereafter, the message with the context enriched template is passed to the content matching engine.

Figure 8:
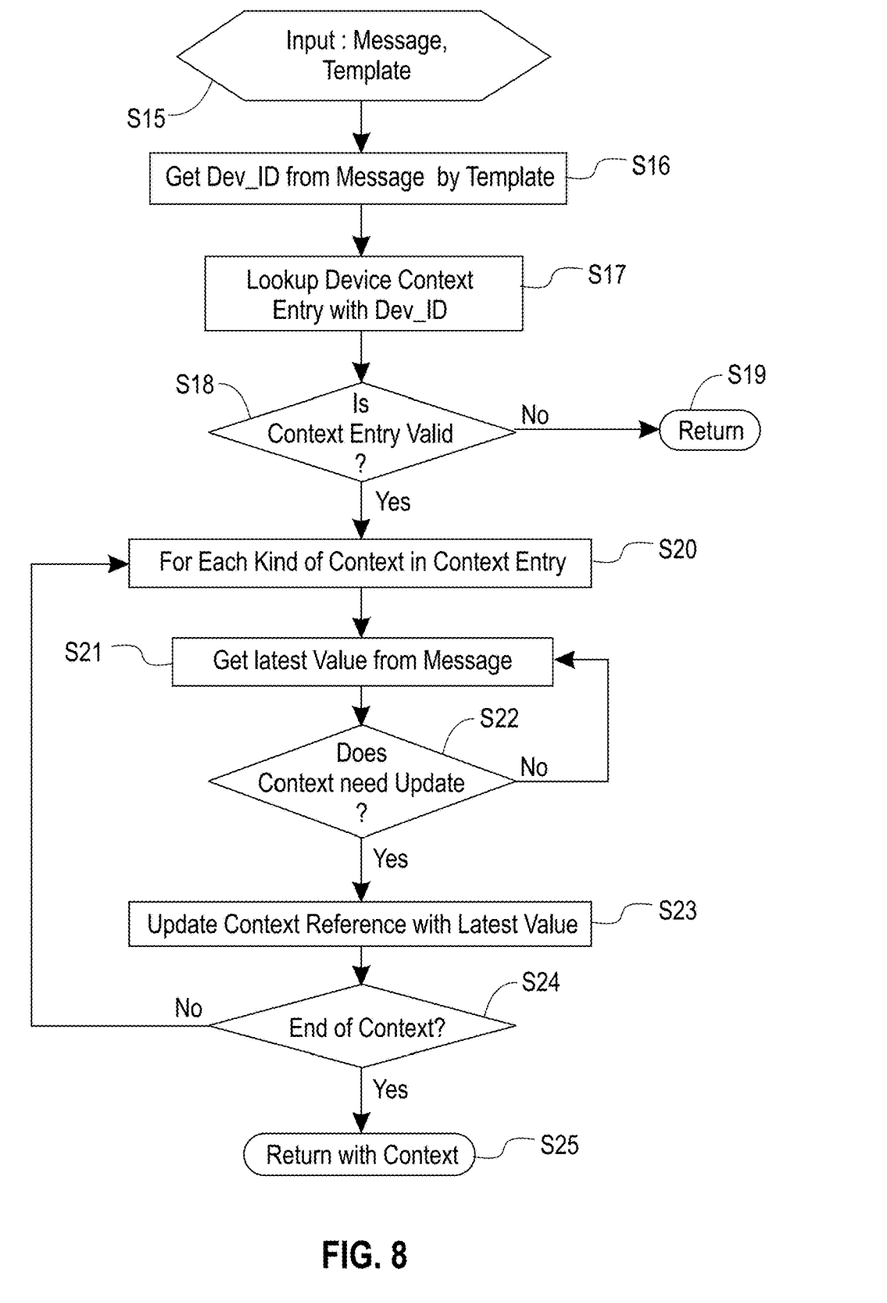
FIG. 8 is a flow diagram of a context fusion module according to an embodiment of the invention.

FIG. 8 is a flow diagram of the data flow for updating the context entries in the context fusion module. In step S15 the message and message template are input. In step S16 the device ID is obtained from the item position list in the template. In step S17 the device context entries are looked up with the device ID. In step S18 a determination is made as to whether the context entries are valid. In step S18 a null is returned if all the context entries are not valid. If the context entry is valid, step S20 indicates that operations S21-S23 are performed for each valid context descriptor in the context entry. Step S21 fetches the context key for the context entry from the message. Step S22 verifies whether the context key with the incoming message is a new key. Step S23 leverages a hash function in the context template on a new key value, to find a new context record in the corresponding context tables, and puts a new key into the context descriptor in the context entry. Step S24 determines whether the last context entry has been checked for an update. If no, then the flow returns to step S20. If the last context entry has been checked for an update, then the context template is returned. If the context entry does not need an update, no in step S21, the flow moves to step S24.

Data message may include variant fields such as: variant length of simple element array, such as integer/float/short array; variant length of structure element array, such as imaginary number array; and variant length of variant size element array, such as vector array. Messages may also have variant field message definition in type length value (TLV), such as: tag includes "S" bit (bit5) to indicate it is a structure/capsulate structure; len indicates the size of variant field; and sub TLVs in variant tag identify themselves.

In order to provide template based parsing described above of messages having variant fields, the variant length information is put to a device specific context entry. In addition, array element parsing is invoked with another template. Fields after variant field will use a relative offset in the template, which will be used to calculate a real offset with variant field length.

Figure 9:
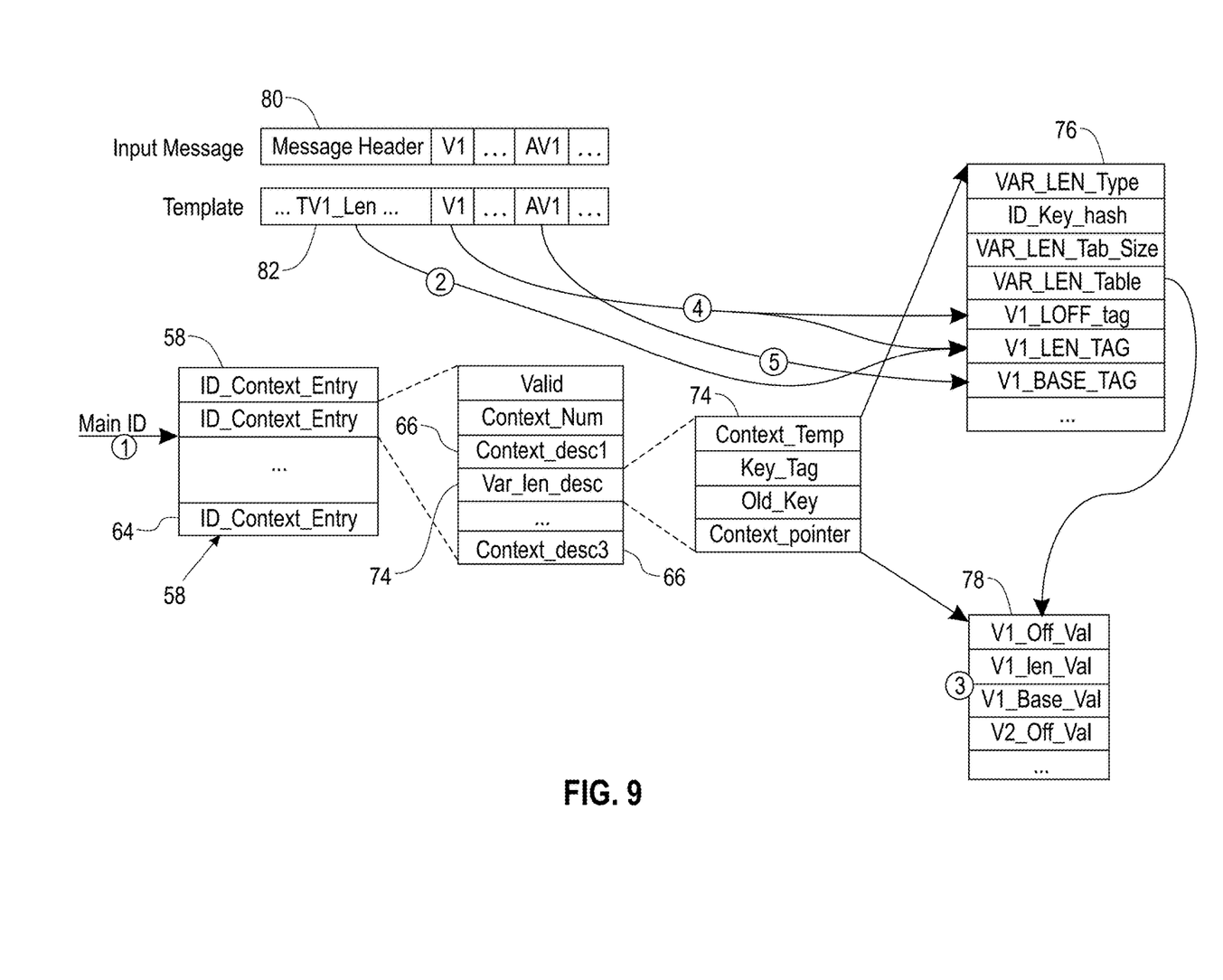
FIG. 9 is a schematic view of variant length message parsing in a of a context fusion module according to an embodiment of the invention.

In one embodiment a variant length context descriptor is provided in the context fusion module. For example, in one embodiment, a variant-length tag support is provided in the item attributes of a message descriptor. FIG. 9 is a schematic view of the variant message parsing within the context fusion module. The variant field length information is described in TLV format, contained in a variant length context entry descriptor 74 added to the list of valid context entry descriptors 66. The variant length descriptor 74 includes the context template 76, a key tag, a device ID and a context pointer. The variant length template 76 includes the variant length context type, ID key hash, length tab size, offset tag, length tag, base tag and a pointer to the variant length context table. The table 78 includes the offset value, length value and base offset value. The variant length context table 78 helps the message parser 42 locate the variant length context entry.

In one example, input message 80 includes a message header, a variant field V1, and fields after the variant one AV1. Message template 82 describes a sequence of context fields, including TV1_Len, which is the length indication of variant field V1, variant field V1 and field AV1. The method of variant length message parsing includes: first, find ID context entry of the device and its variant length context descriptor, according to main ID of message; second, find and fill V1 length in the variant length context entry with TV1_Len value, according to the key tag indication in variant length context descriptor 74; third, update V1_base_valwith the new result of V1_off_val plus V1_len in variant length context table 78; fourth, get V1_base_val according to tag/context dependence indication; and fifth, runtime calculate AV1 offset according to V1_base_val and its relative offset in the message template.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 10:
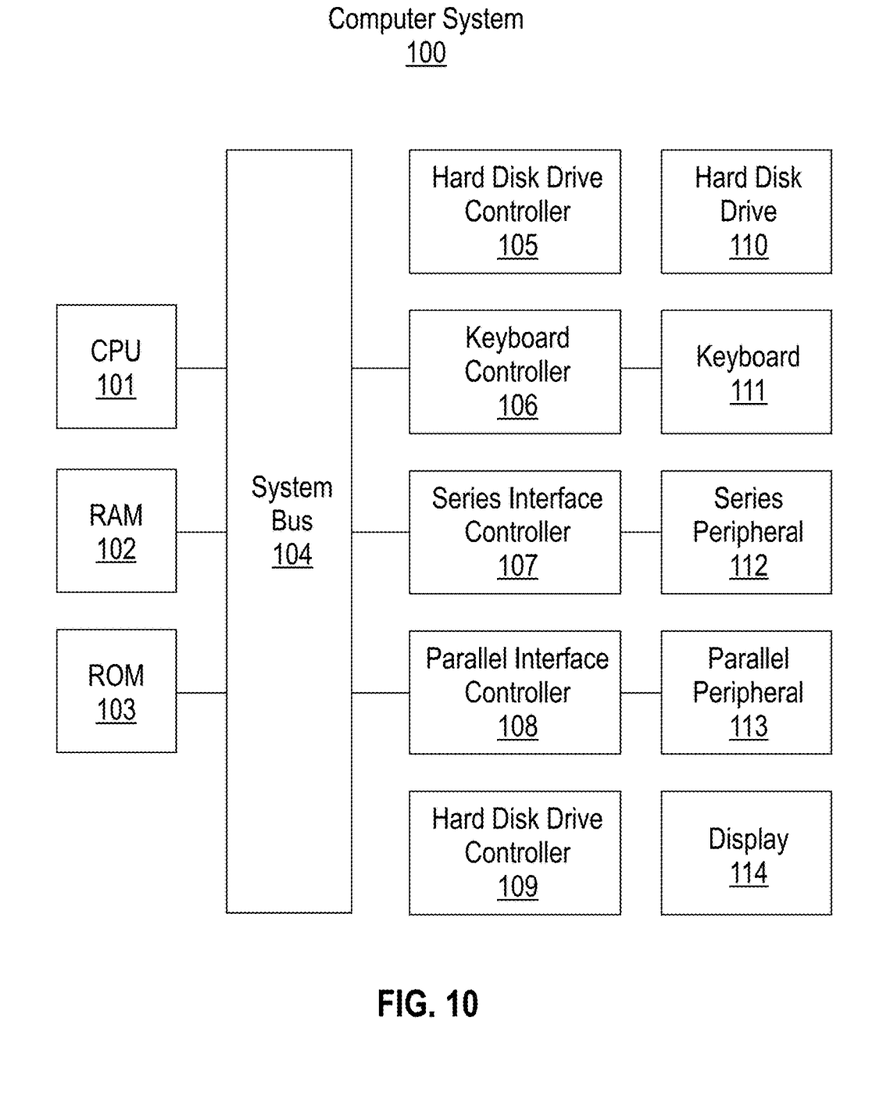
FIG. 10 is a block diagram of an exemplary computing system suitable for implementation of this invention.

FIG. 10 shows an exemplary computer system 100, which is applicable to implement embodiments of the present invention. As shown in FIG. 10, computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 10 is only for exemplary purposes rather than any limitation to the present invention. In some cases, some devices can be added to or removed from computer system 100 based on specific situations.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the above. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the above. In the context of this invention, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including, but not limited to, wireless, wire line, optical fiber cable, RF, etc., or any suitable combination of the foregoing.

Computer program code for carrying out operations for aspects of the present invention can be written in any combination of one or more programming languages, including an object oriented programming language, such as Java, Smalltalk, C++, and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatuses (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture, including instruction means which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented method such that the instructions which execute on the computer or other programmable apparatus provide processes for implementing the functions/acts specified in the flowchart and/or block diagram block or blocks.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method of message adaptation in the Internet of Things (IoT), the IoT comprises a data center having a plurality of applications, an application gateway, a wide area network, a network of access appliances and a plurality of sensing devices, the method comprising:
   receiving at the application gateway a message containing data collected by the plurality of sensors, the message having a message descriptor including message type, payload type, message configuration and whether the message is binary;
   parsing at the application gateway the message according to the message descriptor;
   generating at the application gateway a message template based on the parsed message descriptor;
   storing at the application gateway the generated message template in memory;
   integrating context information into the generated message template using variant message parsing;
   obtaining context descriptors from the message;
   integrating the context descriptors into the generated message template; and
   outputting the message with the generated message template from the application gateway to a corresponding application in the data center for content-based processing.

2. The method according to claim 1, further including, identifying the message is a text message, parsing the message according to message type and creating a sequence of key-value pairs for the text message.

3. The method according to claim 1, further including verifying a validity of the matched message template with the message.

4. The method according to claim 3, wherein the generated message template includes the message type, a message item list and a message item position list.

5. The method according to claim 4, wherein the parsing includes parsing a sequence of the items in the message and listing the items in the position list according to the sequence.

6. The method according to claim 1, further including getting a message ID, device ID and client ID from the message, looking up and verifying the context descriptors according to the message ID, device ID and client ID in an ID-context mapping table, finding a context entry corresponding to each of the context descriptors and a related tag, and integrating the context descriptors of the context entries into the generated message template.

7. The method according to claim 6, further including for each kind of context in the context entry, determining that the context entry needs to update, getting a latest value from the message and updating the context entry with latest value.

8. The method according to claim 1, further including:
   receiving a subsequent message containing data collected by the plurality of sensors, the subsequent message having a message descriptor including message type, payload type, message configuration and whether the message is binary;
   identifying a message type of the received message;
   looking up a message descriptor according to the message type;
   looking up a message template matching the message type; and
   outputting the subsequent message with the matched message template to a corresponding application in the data center for content-based processing.

9. A non-transitory article of manufacture tangibly embodying computer readable instructions, which when implemented, cause a computer to perform the steps of a method for message adaptation in the Internet of Things (IoT), the IoT comprises a data center having a plurality of applications, an application gateway, a wide area network, a network of access appliances and a plurality of sensing devices, the method comprising:
   receiving at the application gateway a message containing data collected by the plurality of sensors, the new message having a message descriptor including message type, payload type, message configuration and whether the message is binary;
   parsing at the application gateway the message according to the message descriptor;
   generating at the application gateway a message template based on the parsed message;
   storing at the application gateway the generated message template in memory;
   integrating context information into the generated message template using variant message parsing;
   obtaining context descriptors from the message;
   integrating the context descriptors into the generated message template; and
   outputting the message with the generated message template from the application gateway to a corresponding application in the data center for content-based processing.

10. The non-transitory article of manufacture according to claim 9, further including, identifying the message is a text message, parsing the message according to message type, and creating a sequence of key-value pairs for the text message.

11. The non-transitory article of manufacture according to claim 9, wherein the generated message template includes the message type, a message item list and a message item position list, wherein the parsing includes parsing the sequence of the items in the message and listing the items in the position list according to the sequence.

12. The non-transitory article of manufacture according to claim 9, further including getting a message ID, device ID and client ID from the message, looking up and verifying the context descriptors according to the message ID, device ID and client ID in an ID-context mapping table, finding a context entry corresponding to each of the context descriptors and a related tag, and integrating the context descriptors of the context entries into the generated message template.

13. The non-transitory article of manufacture according to claim 12 further including:
  receiving a subsequent message containing data collected by the plurality of sensors, the subsequent message having a message descriptor including message type, payload type, message configuration and whether the message is binary;
  identifying a message type of the received message;
  looking up a message descriptor according to the message type;
  looking up a message template matching the message type; and
  outputting the subsequent message with the matched message template to a corresponding application in the data center for content-based processing.

14. A computer system for message adaptation in the Internet of Things (IoT), the IoT comprises a data center having a plurality of applications, an application gateway, a wide area network, a network of access appliances and a plurality of sensing devices, the computer system comprising:
  one or more computer processors;
  one or more non-transitory computer-readable storage media;
  program instructions, stored on the one or more non-transitory computer-readable storage media, which when implemented by the one or more processors, cause the computer system to perform the steps of:
  receiving at the application gateway a message containing data collected by the plurality of sensors, the new message having a message descriptor including message type, payload type, message configuration and whether the message is binary;
  parsing at the application gateway the message according to the message descriptor;
  generating at the application gateway a message template based on the parsed message descriptor;
  storing at the application gateway the generated message template in memory;
  storing at the application gateway the generated message template in memory;
  integrating context information into the generated message template using variant message parsing;
  obtaining context descriptors from the message;
  integrating the context descriptors into the generated message template; and
  integrating context information into the generated message template using variant message parsing;
  obtaining context descriptors from the message;
  integrating the context descriptors into the generated message template; and
  outputting the message with the generated message template from the application gateway to a corresponding application in the data center for content-based processing.

15. The computer system according to claim 14, further including, program instructions which cause the computer system to perform the steps of identifying the message is a text message, parsing the message according to message type, and creating a sequence of key-value pairs for the text message.

16. The computer system according to claim 14, further including, program instructions which cause the computer system to perform the steps of determining that there is no matched or valid matched message template and parsing the message according to the message descriptor to generate and storing a message template including the message type, a message item list and a message item position list, attaching the message template to the message, wherein the parsing includes parsing the sequence of the items in the message and listing the items in the position list according to the sequence.

17. The computer system according to claim 14, further including program instructions which cause the computer system to perform the steps of getting a message ID, device ID and client ID from the message, looking up and verifying the context descriptors according to the message ID, device ID and client ID in an ID-context mapping table, finding a context entry corresponding to each of the context descriptors and a related tag, and integrating the context descriptors of the context entries into the generated message template.

18. The computer system according to claim 17, further including:
  receiving a subsequent message containing data collected by the plurality of sensors, the subsequent message having a message descriptor including message type, payload type, message configuration and whether the message is binary;
  identifying a message type of the received message;
  looking up a message descriptor according to the message type;
  looking up a message template matching the message type; and
  outputting the subsequent message with the matched message template to corresponding application in the data center for content-based processing.

* * * * *

UNITED STATES PATENT AND TRADEMARK OFFICE
CERTIFICATE OF CORRECTION

PATENT NO. : 10,230,681 B2
APPLICATION NO. : 14/968137
DATED : March 12, 2019
INVENTOR(S) : Yi Ge Page 1 of 1

It is certified that error appears in the above-identified patent and that said Letters Patent is hereby corrected as shown below:

On the Title Page (72) Inventors should read as: Yi Ge, Beijing (CN); Jian Wang, Beijing (CN); Qi Yu, Beijing (CN); Guotao Zhao, Beijing (CN) Yu Chen Zhou, Beijing (CN)

Signed and Sealed this
Sixth Day of October, 2020

Andrei Iancu
*Director of the United States Patent and Trademark Office*